Oct. 10, 1939.    T. C. GRAY    2,175,752
FLEXIBLE JOINT
Filed Sept. 29, 1937    2 Sheets-Sheet 1

Inventor:
Thomas C. Gray,
By his Attorneys.

Oct. 10, 1939.    T. C. GRAY    2,175,752
FLEXIBLE JOINT
Filed Sept. 29, 1937    2 Sheets-Sheet 2
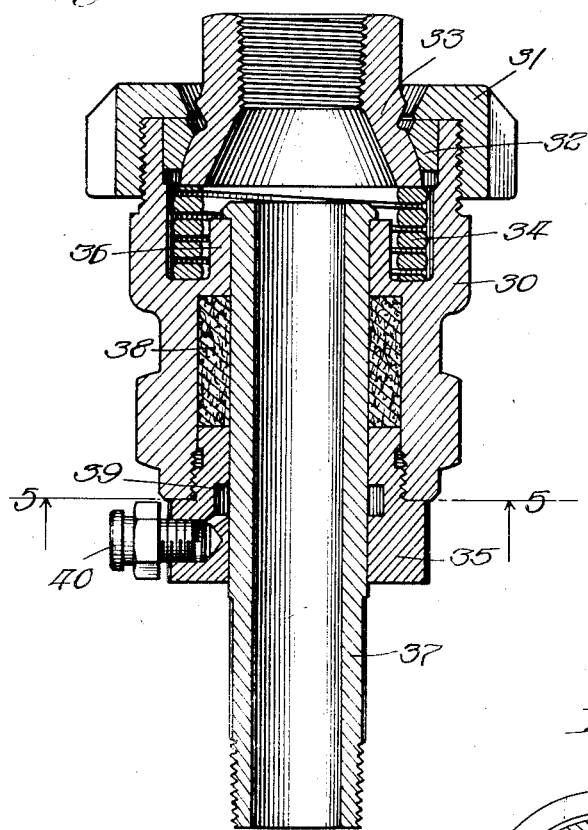
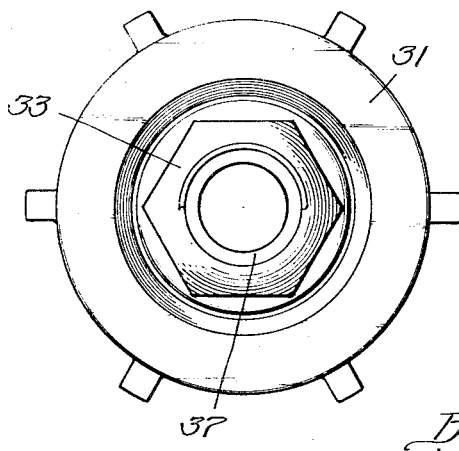
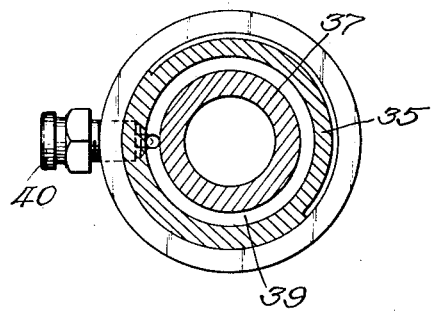

Patented Oct. 10, 1939

2,175,752

UNITED STATES PATENT OFFICE 2,175,752

FLEXIBLE JOINT

Thomas C. Gray, Evanston, Ill., assignor to Barco Manufacturing Company, a corporation of Illinois Application September 29, 1937, Serial No. 166,448

2 Claims. (Cl. 285—92)

This invention relates to a flexible joint, and more particularly to a joint for use with a rotating device.

Figure 1:
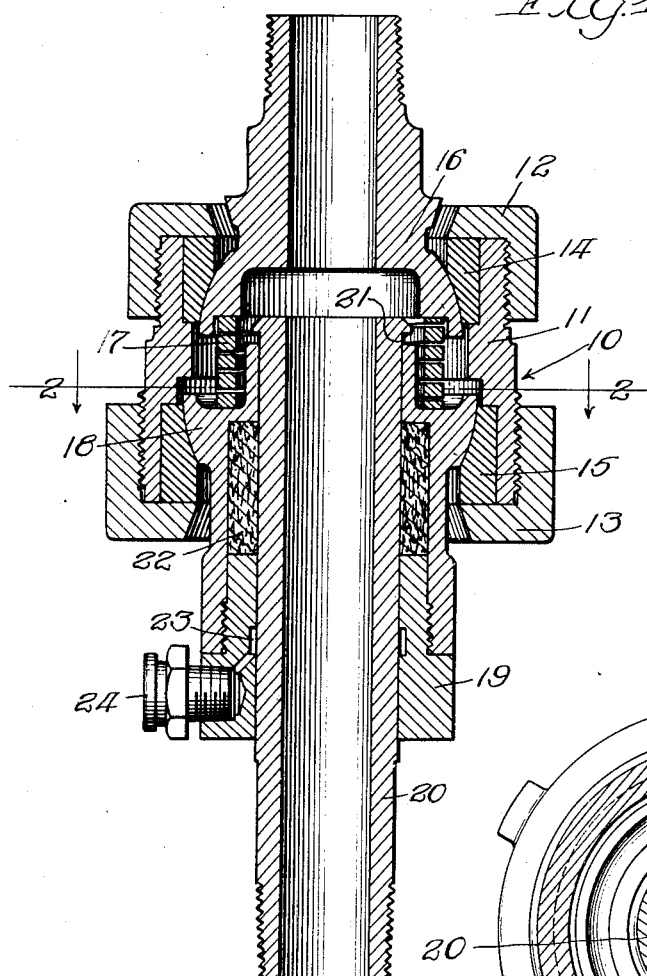
Figure 2:
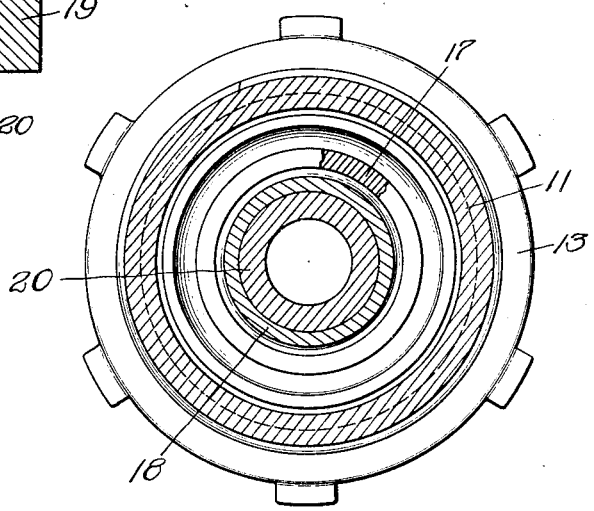

One feature of this invention is that it permits rotational movement of one member with which the joint is connected with respect to another member with which the joint is connected; another feature of this invention is that it permits lateral displacement, as by vibration, between two members or conduit sections to which the joint is connected; yet another feature of this invention is that it enables longitudinal displacement between two members to which the joint is connected; other features and advantages of this invention will be apparent from the following specification and the drawings, in which:

Fig. 1 is a longitudinal sectional view of a flexible joint embodying this invention; Fig. 2 is a transverse sectional view along the line 2—2 of Fig. 1; Fig. 3 is a sectional view of another modification of this invention; Fig. 4 is a top plan view of the joint shown in Fig. 3; and Fig. 5 is a transverse sectional view along the line 5—5 of Fig. 3.

It is frequently highly desirable, in the use of flexible ball joints, to permit relatively high speed rotation of one of the members. This is true in connection with various rotating members, such as drums used in laundry work, where it is desirable to have a conduit at the axis of rotation of the drum and to permit the passage of fluid through where the drum in rotating. While a ball joint may permit rotation of the ball with respect to the retaining element or gasket against which it is sealed, if such rotation is at very high speed or for very long duration the gasket will be so worn as to render the joint ineffective. In addition, there are lateral or transverse vibrations resulting from rotation of heavy drums at high speed, and even some movement parallel to the axis, all of which movements must be compensated for in the joint if rigid conduits are to be used for the flow of the fluid.

The present invention accomplishes these objects by providing a flexible joint with ball and socket elements having a tube journaled in one of said elements for longitudinal and rotatable movement, which tube is rotatable with respect to said element more readily than said elements are with respect to each other. Thus, the rotation may be localized between the tube and the element, at a bearing surface specifically designed for this purpose; flexing may take place between the ball and socket elements; and movement along the axis of the joint may take place by longitudinal displacement between the tube and the element in which it is journaled. Where considerable transverse vibration is encountered, two ball elements may be used in one socket element, so that the axes of the two ball elements may be displaced while remaining parallel with each other.

In the particular embodiment of this invention illustrated in Figs. 1 and 2 a socket element 10 is shown as having a substantially cylindrical body portion 11 having cap members 12 and 13 threaded on each end thereof. Each end of the socket element has a retaining portion provided by gaskets, here shown as 14 and 15, which gaskets are held in place by the aforementioned cap members and have inner surfaces which are annular sectors of a sphere, or substantially so.

A ball element 16 is adapted to be received within the socket element and retained in movable sealing engagement with the inner surface of the annular portion or gasket 14 by any convenient means, as the spring 17. This ball element is of conventional type, being adapted to be connected to one portion of a conduit of one member to which the joint is fastened, and having an opening or passage therein through which fluid may be admitted to the joint.

The other end of the socket element is adapted to receive and retain in sealing engagement with the gasket 15 a ball element 18, which ball element is of slightly larger diameter than the element 16. Each of the ball elements oppose each other, so that their axes coincide, and they are provided with shoulders forming the seats for the spring 17 so that the one spring holds both ball elements in proper relation to their annular retaining gaskets. The provision of the two ball elements with one socket element enables considerable flexing of the joint, and also displacement of the axes of the two ball elements while remaining parallel to each other.

The element 18 is here shown as having threaded in the outer end thereof a sleeve member 19, the inner surface of this member forming a bearing surface. The element 18 may also have, at the inner end thereof, a bearing surface in alignment therewith. A tube or pipe member 20 is journaled in the ball element 18 on the two bearing surfaces mentioned, in sealing engagement therewith, the arrangement being such that the tube is capable of longitudinal and rotational movement with respect to the ball element 18. The tube may be provided with a shoulder 21 preventing its dropping out of the joint, but the two ball elements must be separated a sufficient amount, as shown, to permit the desired longitudinal movement.

The joint thus described, having two ball elements and a member rotatably and slidably journaled in one of the elements, provides a very wide range of movement between two pipes or devices to which it may be attached. The provision of the two ball elements is particularly advantageous, not only because the joint thus permits an angle of bend between two pipes twice that of a single ball joint, but also, and most important, because it permits the two pipes to be displaced or vibrated transversely with respect to each other while their axes remain parallel to their original position. Such lateral displacement is accommodated by this joint without any of the bending or other strain on the pipes found when such displacement occurs between two pipes connected by the usual joint. That is, the preferred joint disclosed herein permits any movement of one pipe with respect to the other, within the range of accommodation of the joint, and does not restrict such movement to one about the center of movement of one ball element.

In order to insure a proper seal between the rotatable tube 20 and the ball element 18 to prevent the loss of fluid from the joint between these parts any conventional packing material 22 may be used. Likewise, in order to make the tube readily rotatable with respect to the ball element 18 the bearing surface of the sleeve member 19 is here shown as provided with a lubricating groove 23 supplied with lubricant by a cup or fitting 24. The tube must rotate within the ball element 18 with relative ease with respect to the resistance to rotation between the ball elements and the socket element, so that any rotation between the members to which the joint is connected will be taken care of on the bearing surfaces provided therefor, rather than between a ball element and a gasket.

In the embodiment of this invention illustrated in Fig. 3 only one ball element is used, the tube being here rotatably and longitudinally journaled in the socket element. The socket element 30 is shown as having threaded on the upper end thereof a cap 31 holding in place an annular retaining gasket 32 against which a ball element 33 is held in movable sealing relation by a spring 34. The lower end of the socket element 30 has mounted therein a sleeve bearing 35, an upper corresponding bearing being provided by a portion 36 of the socket element. These two bearing surfaces have journaled therein a tube 37, the tube being readily rotatable and longitudinally movable with respect thereto. Packing material 38 and a lubricating groove 39 and fitting 40 are provided as in the preceding modification.

This joint also is adapted to be connected in a conduit for fluid wherein one member rotates relatively rapidly with respect to the other. One member of the conduit, as for example a pipe, can be threaded into the ball element 33; and a rotatable drum, for example, may have the tube 37 threaded into an opening at the axis thereof. This modification of the invention is similar to that illustrated and described in Figs. 1 and 2, except that any lateral displacement must be absorbed by flexing of the conduit.

While I have described and claimed certain embodiments of my invention it is to be understood that it is capable of many modifications. Changes, therefore, in the construction and arrangement may be made without departing from the spirit and scope of the invention as disclosed in the appended claims in which it is my intention to claim all novelty inherent in my invention as broadly as permissible in view of the prior art.

I claim:

1. In a coupling between a pipe section and second pipe section rotating with respect thereto, a sleeve-like socket element having an annular segmental spherical bearing surface therein, a ball element mounted in said socket element and adapted to seat on said bearing surface, one of said elements having a bore therethrough with one of the pipe sections rotatably mounted therein, and seal means between said last-mentioned element and pipe section, the construction and arrangement being such that any angular movement incident to operation of the device takes place between the ball element and the bearing surface while free rotational movement is permitted between the pipe section and the element in which it is rotatably sealed.

2. In a coupling between a pipe section and a second pipe section rotating with respect thereto, a sleeve like socket element having oppositely disposed annular segmental spherical bearing surfaces therein, a pair of ball elements mounted in said socket element, each of said ball elements being adapted to be seated on and held in movable sealing engagement with one of said bearing surfaces, one of said ball elements being secured to one of said pipe sections and the other having a bore therethrough with one of the pipe sections extending therethrough and mounted therein, and means providing a fluid-tight seal between said last mentioned pipe section and element while permitting free rotational and limited sliding movement between said pipe section and ball element, the construction and arrangement being such that any angular movement or axial displacement between said pipe sections is permitted by movement between the ball elements and bearing surfaces while free rotational movement is permitted between said other pipe section and the ball element in which it is rotatably sealed.

THOMAS C. GRAY.